(12) United States Patent
Lipp et al.

(10) Patent No.: US 7,612,286 B2
(45) Date of Patent: Nov. 3, 2009

(54) INJECTION MOLDED PROTECTIVE PASSAGEWAY FOR AUTOMOTIVE WIRING AND THE LIKE AND METHOD OF MAKING SAME

(75) Inventors: Douglas Christian Lipp, Ann Arbor, MI (US); Jeremy Nathaniel King, Ypsilanti, MI (US)

(73) Assignee: Yazaki North America, Inc., Canton, MI (US)

( * ) Notice: Subject to any disclaimer, the term of this patent is extended or adjusted under 35 U.S.C. 154(b) by 694 days.

(21) Appl. No.: 11/336,210

(22) Filed: Jan. 20, 2006

(65) Prior Publication Data

US 2007/0181336 A1    Aug. 9, 2007

(51) Int. Cl.
*H02G 3/04* (2006.01)
(52) U.S. Cl. .................. 174/68.1; 174/101; 174/92; 174/135; 174/683; 248/74.1; 138/162
(58) Field of Classification Search ............... 174/68.1, 174/68.3, 101, 92, 136, 135, 683; 138/162, 138/156, 157, 166; 248/74.1, 268.1
See application file for complete search history.

(56) References Cited

U.S. PATENT DOCUMENTS

| | | | |
|---|---|---|---|
| 3,256,892 A | 6/1966 | Esposito, Jr. ............... 132/83 |
| 3,552,595 A | 1/1971 | Gerner et al. ............... 220/16 |
| 3,793,612 A | 2/1974 | Driscoll ..................... 339/98 |
| 4,418,819 A | 12/1983 | Shapiro ..................... 206/216 |
| 5,128,829 A | 7/1992 | Loew ........................ 361/380 |
| 5,665,936 A * | 9/1997 | Sawamura et al. ........... 174/32 |
| 6,234,429 B1 * | 5/2001 | Yang ........................ 248/74.1 |
| D458,135 S | 6/2002 | Hierzer ..................... D9/446 |
| 7,318,621 B2 * | 1/2008 | Suzuki et al. ............... 296/208 |

FOREIGN PATENT DOCUMENTS

| GB | 2 247 717 A | 3/1992 |
|---|---|---|
| JP | 408051714 A * | 2/1996 |

* cited by examiner

*Primary Examiner*—Dhiru R Patel
(74) *Attorney, Agent, or Firm*—Young Basile

(57) ABSTRACT

An improved bridge-shaped molded plastic passageway to carry an automotive wiring harness over a driveshaft tunnel in an automobile chassis is disclosed. The passageway is made up of conforming base and cover components joined by two parallel hinged connectors. The base and cover are molded in a co-oriented condition so the cover is right-side-up relative to the base in both the open and closed conditions. Closing the passageway is accomplished by rectilinear movement of the cover relative to the base and the connector elements are concealed within the passageway when closed. Mold height and draw are dramatically reduced by this design.

14 Claims, 5 Drawing Sheets

FIG - 7
PRIOR ART
FIG - 8
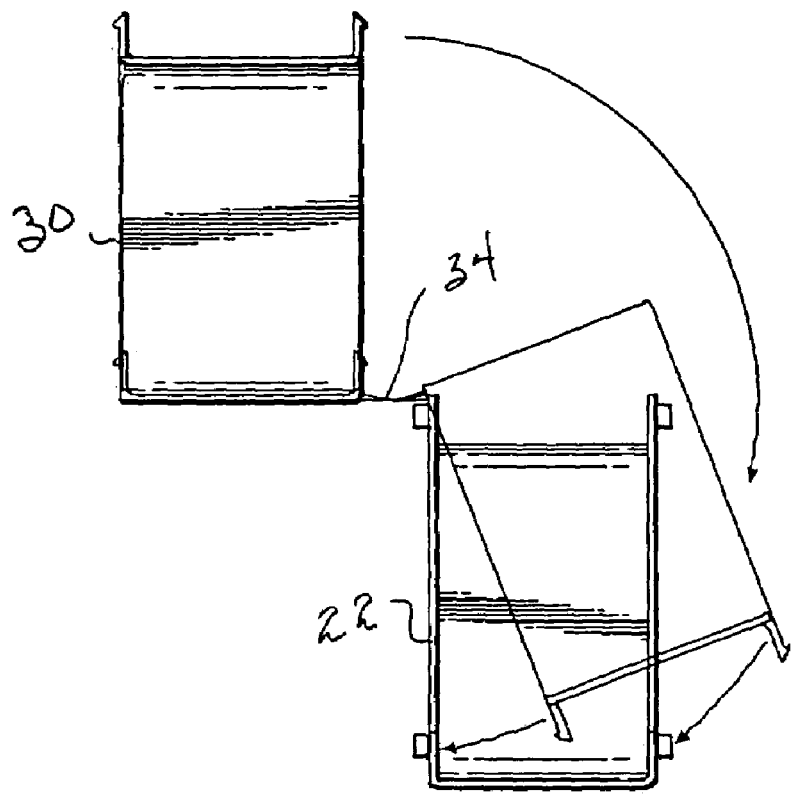
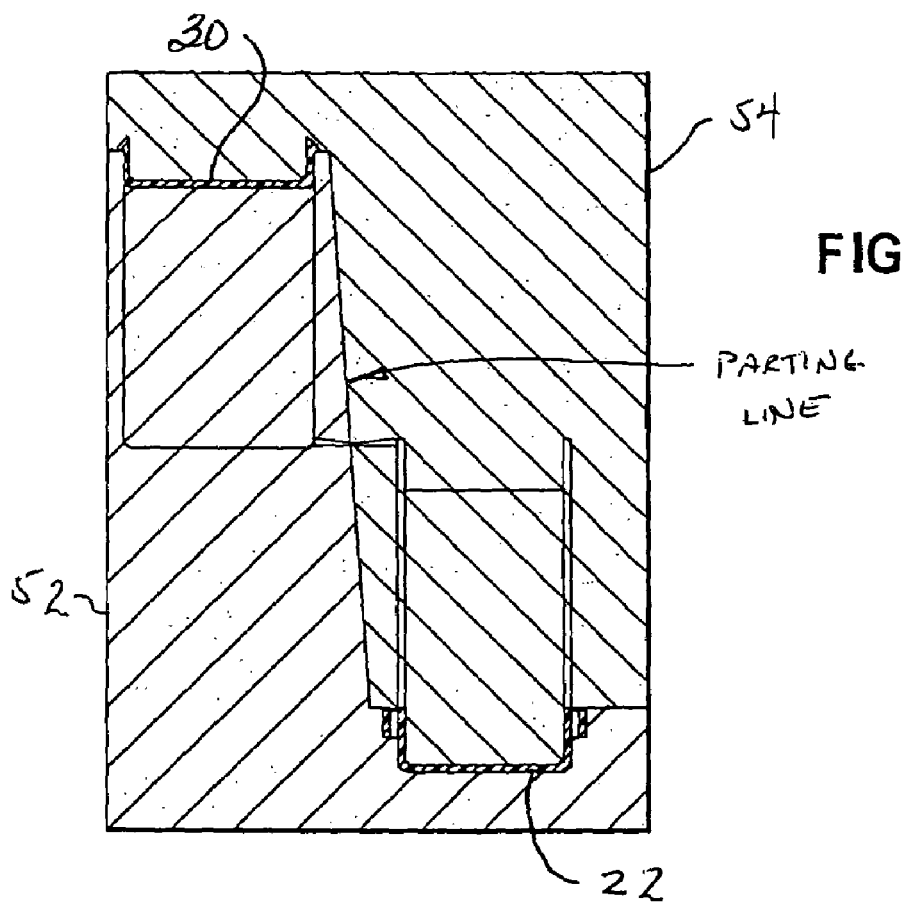

INJECTION MOLDED PROTECTIVE PASSAGEWAY FOR AUTOMOTIVE WIRING AND THE LIKE AND METHOD OF MAKING SAME

FIELD OF THE INVENTION

This invention relates to accessible, protective, open-ended receptacles defining passageways for automotive wiring and the like, as well as to a method of injection molding same.

DEFINITIONS

The following definitions are used throughout this specification:

(1) The term "accessible", when used to refer to a protective passageway-defining receptacle, means a passageway which can be selectively opened and closed by manipulation of a cover relative to a base.

(2) The term "bridge-shaped" as used herein refers to a passageway or a component thereof having a center section which is displaced relative to the ends. It includes "arcuate," "semi-rectangular" and "semi-trapezoidal."

BACKGROUND OF THE INVENTION

Two-part, snap-together receptacles for use in automobiles and other complex assemblies are often made with hinges or tethers joining a cover to a base so that they remain together during shipment, handling, and installation. An example is the bridge-shaped, open-ended passageway which is used to route automotive wiring over a drive-shaft tunnel in an automobile chassis. Such a device is shown at 20 in prior art FIG. 6 to comprise semi-trapezoidal base 22 and cover 30 molded as a single part joined by hinges 32 and 34. Snap lock features 40, 42, 44, 46, 48 and 50 are used to snap lock the cover 30 to the base 22.

Use of the device 20 involves laying the wiring in the protective passageway so that it extends through and between the opposite open ends of the passageway and thereafter closing the cover 30 onto the base. The closing motion involves a rotational reorientation of the cover 30, by swinging it about hinges 32, 34 through an angle of 180 degrees. The device is then installed to a vehicle chassis.

There are a number of disadvantages associated with the design, manufacture and use of articles of the type shown in FIG. 6. One disadvantage arises out of the fact that the hinges 32, 34 are external. If broken, the folded hinges 32, 34 produce a sharp edge or protrusion which can inflict injury on human handlers.

A manufacturing disadvantage associated with the FIG. 6 device arises out of the fact that the passageway 20 is bridge-shaped. As shown in FIGS. 7 and 8, the base 22 and cover 30 are molded in opposite orientations relative to one another in the mold structures 52, 54. This effectively doubles the height of the mold structures 52, 54 and, depending on the location of the plastic injection inlet, may increase the distance the injected material must flow to completely fill the mold cavities.

SUMMARY OF THE INVENTION

According to a first aspect of the invention, an accessible receptacle of the type having contoured base and cover components integrally connected by one or more hinged connectors is provided wherein the disadvantages of the prior art devices are eliminated; i.e., external hinges and tethers are eliminated, and the cover and base components are moldable in an orientation which can dramatically reduce mold height. In general, this is accomplished by designing the base and cover as well as the hinged connectors therebetween such that the base and cover, when molded and when open, are in the closed orientation and move forward the closed condition by rectilinear rather than pivotal movement.

These and other advantages of the present invention will be best understood from reading the following specification which describes an illustrative embodiment thereof in detail.

BRIEF DESCRIPTION OF THE DRAWINGS

FIG. 7 is a schematic end view of the prior art passageway showing the manner in which the two complemental parts thereof are rotated for joining; and FIG. 8 is a cross-sectional view of a mold apparatus used to make the prior art article.

DESCRIPTION OF ILLUSTRATIVE EMBODIMENT OF THE INVENTION AND METHOD OF MAKING SAME

Figure 1:
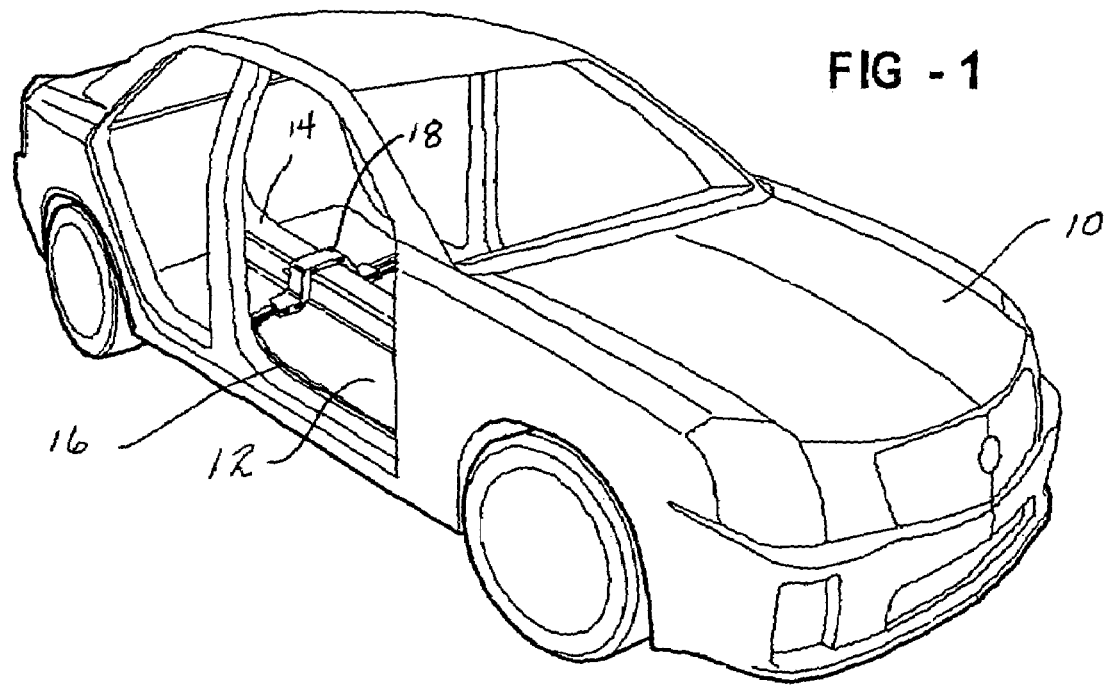
FIG. 1 is a perspective view of an automobile body and chassis assembly showing an accessible passageway device made in accordance with the invention for the protection of a wiring harness running over a driveshaft tunnel.

Referring to FIG. 1 of the drawing, there is shown in outline form an automobile body 10 mounted on a chassis 12 defining a driveshaft tunnel 14 extending longitudinally of the vehicle between the front engine compartment and the rear drive axle (not shown). A representative wiring harness 16 is shown placed on the chassis 12 and running from the right side of the vehicle to the left side of the vehicle over the drive shaft tunnel 14 where it is protected by a bridge-shaped accessible protective passageway 18 made of a suitable plastic such as HDPE or ABS. As explained above, the molded plastic protective passageway device 18 is "accessible" in the sense that it can be opened to lay the wiring harness 16 in place or to service the wiring harness after installation. The passageway device 18 can also be selectively closed, leaving only the ends open for the wiring harness 16 to pass into and out of the passageway 18. The passageway 18 is "bridge-shaped" in that the open ends are co-planar or substantially co-planar and the center section of the passageway 18 lies in a plane which is substantially displaced from the plane of the open ends so as to pass over and conform to drive shaft tunnel 14. In this embodiment the "bridge" shape is semi-trapezoidal, but other shapes can also benefit from the present invention.

Figure 2:
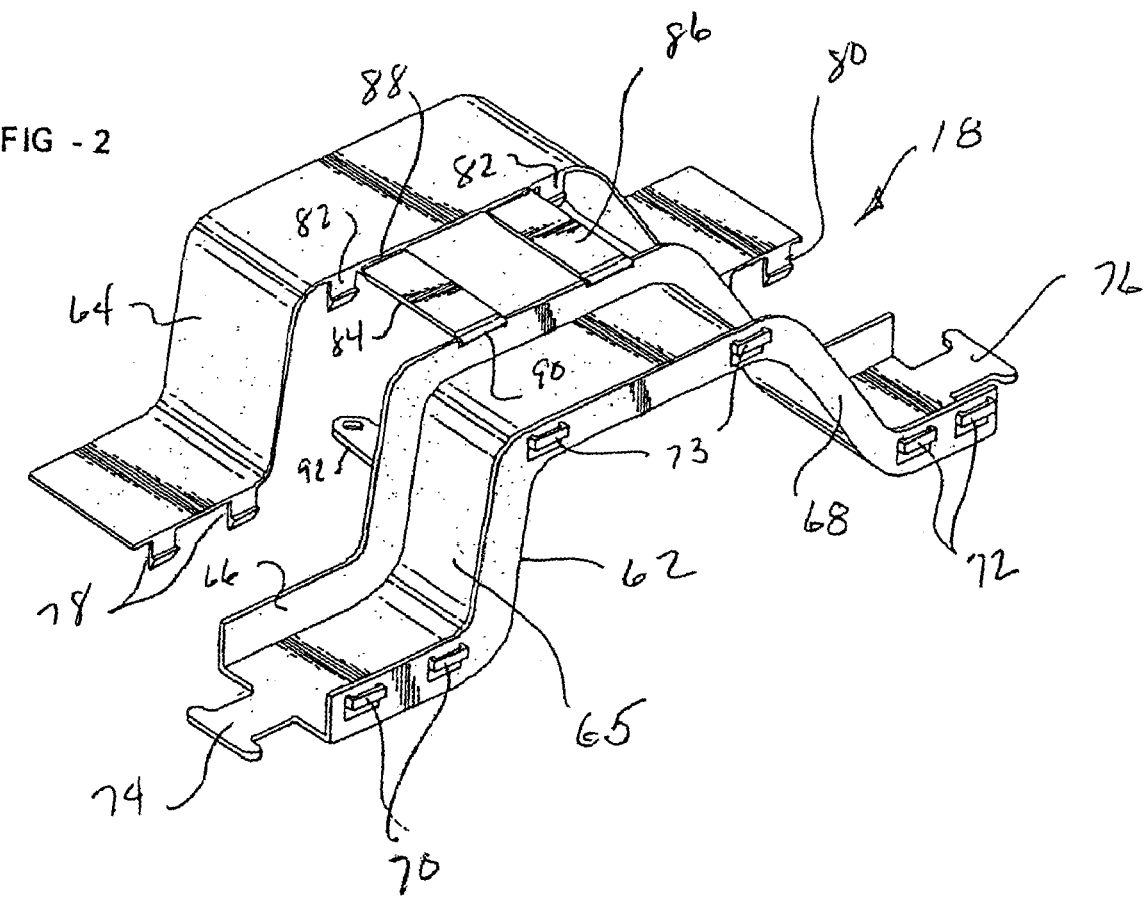
FIG. 2 is a perspective drawing of the improved accessible protective passageway of the present invention.

Referring now to FIG. 2, the accessible protective passageway 18 of the present invention is shown to comprise integral molded plastic bridge-shaped base 62 and conforming cover 64. The base 62 comprises a bottom 65 with continuous opposite sides 66 and 68. Fastener means in the form of female loops 70, 72 and 73 are provided on the sides 66 and 68 of the base 62. In addition, taping tabs 74 and 76 are shown extending from the bottom 65 of the base 62 as extensions of the open ends so that the wiring harness, when placed in the passageway base, can be secured by taping to the base in a known manner.

The cover 64 is also bridge-shaped so as to conform to the base 62 and the two components are joined together by means of integral hinged strap-like connectors 84 and 86 which are hinged at 88 to the inside edge of the cover 64 and at 90 to an inside edge of the side 66 of the base 62. The lengthwise dimension of the connectors 84 and 86 is substantially equal to the width of the cover 64 and base 62 so it can fold into the interior of the passageway device 18 when closed.

The fastener means associated with the cover 64 comprises male barbed tabs 78, 80 and 82 located along the edges of the cover on both sides as shown. A feature 92 is molded integrally with the base 64 to assist in securing the passageway 18 to the automobile as shown in FIG. 1.

Figure 4:
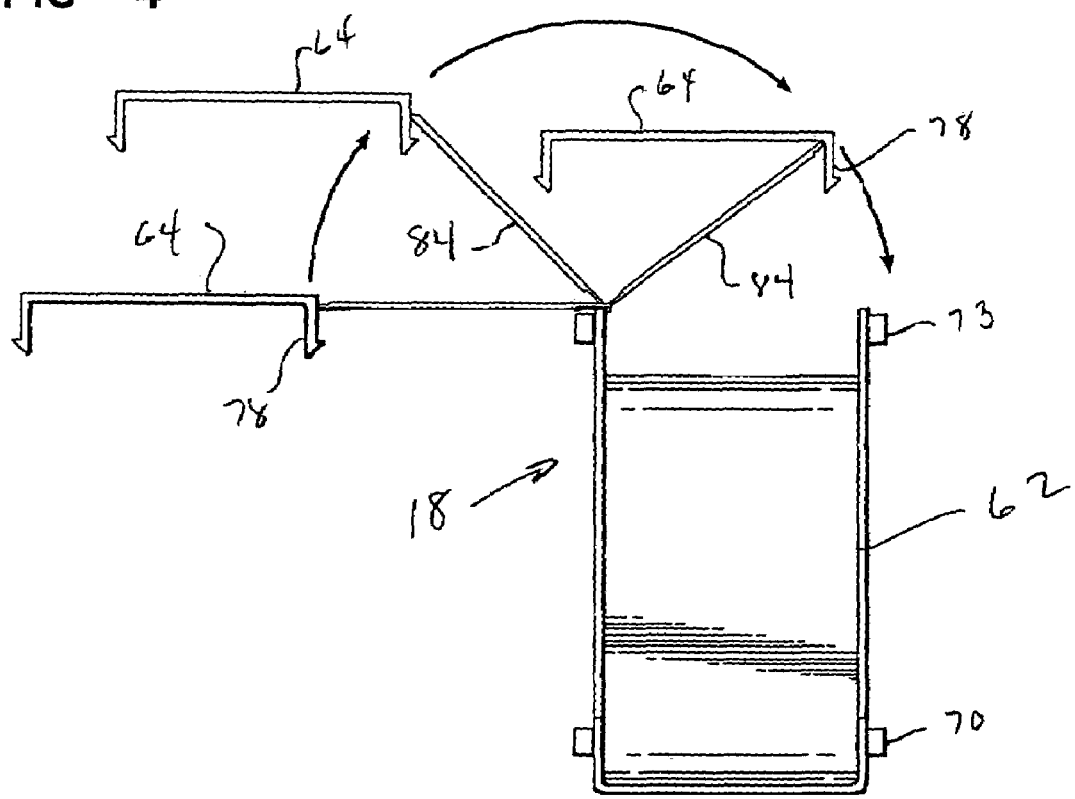
FIG. 4 is a side view of the cover and base of the protective passageway of the present invention showing the manner in which the cover moves rectilinearly relative to the base to join the two components together.
Figure 6:
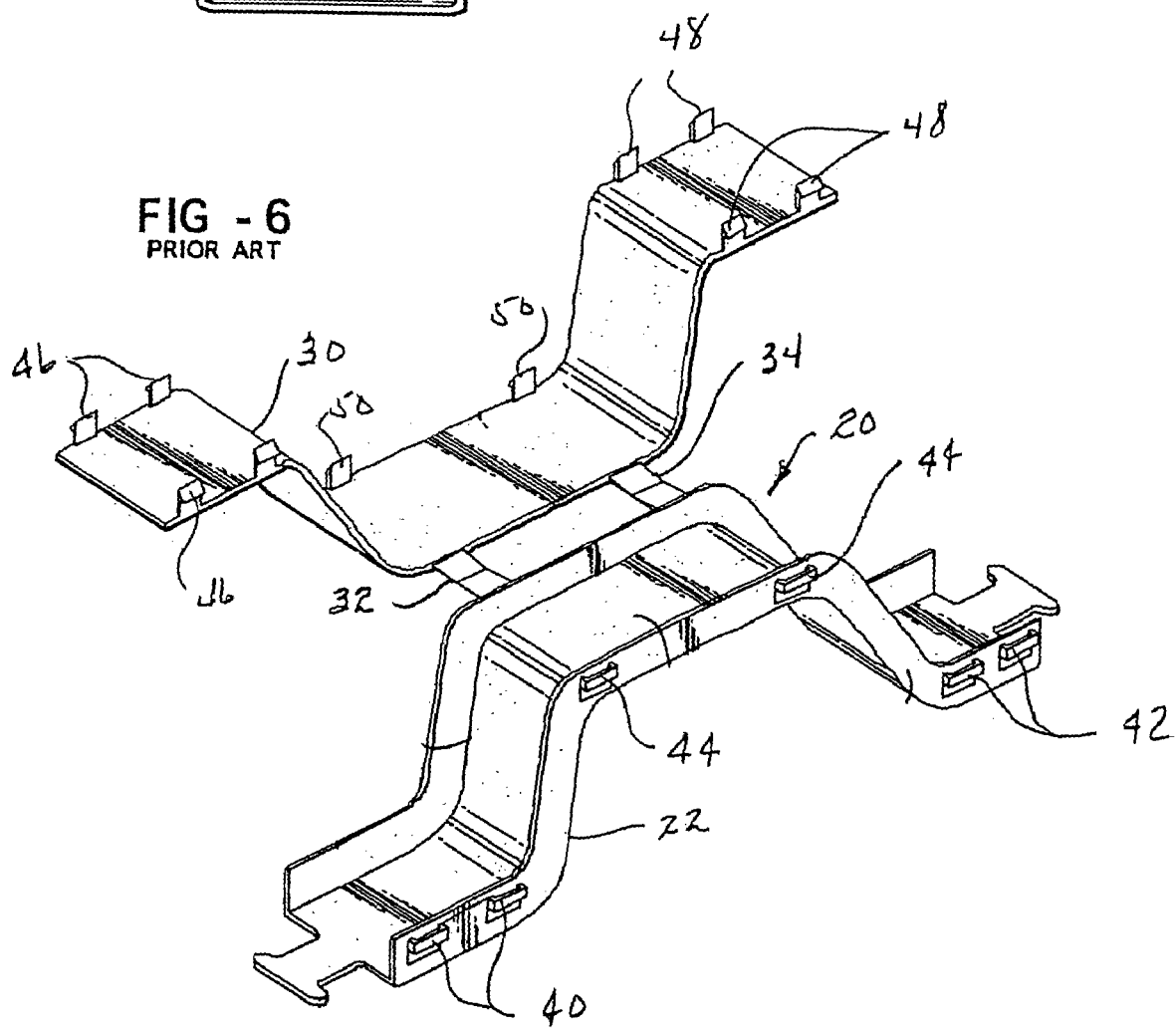
FIG. 6 is a perspective view of a prior art accessible protective passageway.

As shown in FIG. 4, the closing manipulation of the passageway 18 is accomplished by moving the cover 64 rectilinearly until it is brought into covering conformity with the base 62 and the fastener means 78, 80 and 82 are snapped into the female loops 70, 72 and 73. It will be noted in FIGS. 2 and 4 that the cover 64 is always co-oriented with the base 62; i.e., the cover 64 is not "upside down" when opened as is the case for the prior art device shown in FIG. 6. The location of the connectors 84 and 86 and the hinges which integrate the connectors to the base and cover is such that the connectors are totally within the passageway 18 when closed. Therefore, the connectors 84 and 86 are fully concealed by the passageway in the closed condition and cannot produce sharp protruding edges if broken.

Figure 3:
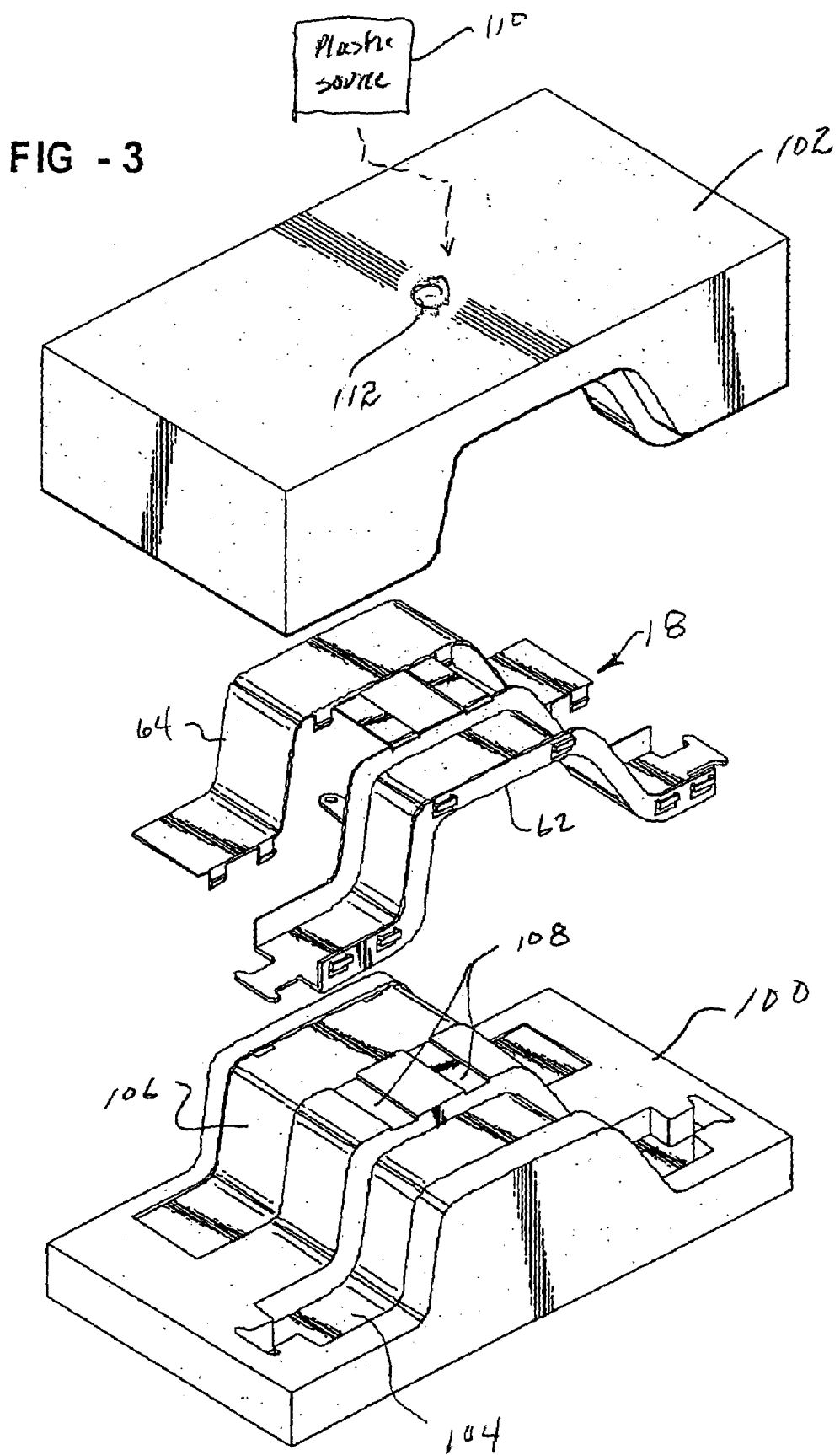
FIG. 3 is a perspective view of the protective passageway of FIG. 2 along with illustrative molding apparatus used to manufacture same.
Figure 5:
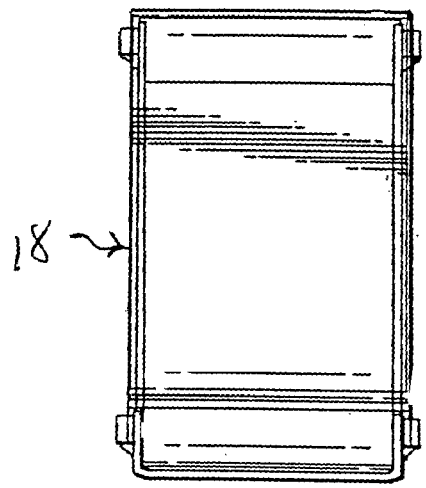
FIG. 5 is an end view of the protective passageway of the present invention.

Referring to FIG. 3 the passageway article 18 in the opened condition is shown between mold components 100 and 102 which are complemental and can be brought together or taken apart by suitable molding press as will be apparent to those skilled in the plastic injection molding arts. The lower mold component 100 is shown to define side-by-side co-oriented first and second mold cavities 104 and 106 corresponding to the base 62 and cover 64, respectively. The two mold cavities are joined by parallel lateral cavities 108 which form the connectors 84 and 86 as well as the hinges associated therewith. Because the base 62 and cover 64 are co-oriented in the molded condition, the height and draw of the mold is dramatically reduced relative to the prior art mold shown in FIG. 8 where the base and cover are molded in opposite spatial orientation.

The steps of the molding process used to manufacture the accessible passageway 18 are as follows:

1. the mold components 102 and 104 are closed to define in combination the interior and co-joined mold cavities 104, 106 and 108 ultimately defining the dimensions and exterior surfaces of the molded article 18;
2. molten plastic such as high-density polyethylene is introduced from a source 110 into the mold cavity through a sprue opening 112 until all of the mold cavities 104, 106 and 108 are completely filled; and
3. after the plastic has sufficiently solidified the mold components 100 and 102 are separated and the article 18 is removed.

Various other additions and modifications to the invention may be made by persons skilled in the art.

What is claimed is:

1. An accessible protective passageway for automotive wiring and the like having opposite open ends and comprising:
   a base having a bottom and sides;
   a cover having a top conforming to the base;
   fastener means complementally located on said base and cover to selectively join the cover to the base and form a continuous passageway between the open ends thereof; and
   at least one connector integral with and extending between the base and cover, said connector being hingedly connected to both one side of the base and the opposite side of the cover and having a length between the base and cover substantially equal to the width of the cover to permit rectilinear displacement of the cover from an open position co-oriented and adjacent to the base to a second position co-oriented and conformingly joined to the base thereby to close the passageway and place substantially the entire length of the connector within the passageway.

2. The accessible protective passageway defined in claim 1 wherein the passageway-defining base and cover are bridge shaped.

3. An accessible protective passageway as defined in claim 1 wherein the fastener means comprises male fastener elements on one of said base and cover and complemental female fastener elements on the other of said base and cover.

4. The accessible protective passageway defined in claim 1 further comprising taping tabs extending from the ends of said bottom.

5. The accessible protective passageway defined in claim 1 wherein the base cover and fastener means are made of plastic.

6. The accessible protective passageway defined in claim 1 further including a second connector integral with and extending between the base and cover in parallel spaced relationship to said at least one connector.

7. An accessible protective passageway as defined in claim 6 wherein the base and cover are bridge shaped such that the center of the base and cover, when joined together, lie in a plane which is spaced from a plane commonly passing through the ends of the passageway and said at least one connector and said second connector are located in or substantially near the center of the passageway and are co-planar.

8. A method of injection molding a bridge-shaped protective passageway for automotive wiring comprising the steps of:
   connecting a source of fluid plastic to first and second parallel and adjacent mold cavities, the first cavity defining a bridge-shaped passageway base having a bottom and sides and the second cavity defining a cover for said base having a top and a width conforming to said base, the mold cavities being such that the curvatures of the bridge-shaped base and cover are side-by-side co-oriented in space to reduce mold height and are joined by a third cavity defining a connector which is flow coupled with and extending between the base cavity and the cover cavity such that the resulting article molded by said connector cavity is integrally hinged to a side of the base and an edge of the cover and has a lengthwise dimension between the cover and the base substantially equal to the width of the cover; and
   injecting fluid plastic into the cavities; and
   removing the molded passageway from the cavities.

9. The method defined in claim 8 wherein the base and cover mold cavities are provided with appendages that define complemental fasteners adjoining the cover to the base in the same orientation as the orientation of the first and second mold cavities.

10. A selectively closable receptacle made of plastic comprising:

a tray-like base having a bottom and opposite side walls, a center portion and opposite end portions;
a cover conforming to the base;
latch means complementally disposed on and between said base and cover to selectively join them together; and
a connector having hinges at each end, the connector joining the cover to the center portion of the base such that the cover moves rectilinearly from an open position beside and co-oriented with the base to a closed position over and co-oriented with the base as the connector is folded into the base between the opposite side walls.

11. The receptacle of claim 10 wherein the base and cover are bridge shaped.

12. The receptacle of claim 11 wherein the connector comprises two parallel, spaced apart hinged straps.

13. A bridge-shaped open ended receptacle defining a passageway for automotive wiring and the like, having open and closed conditions and comprising:

a bridged-shaped base having a bottom and left and right side walls integral with and extending at right angles to the bottom;
a bridged-shaped cover dimensionally conforming to the base and having left and right side edges; and
at least one connector integral with the base and cover and hingedly connected to both one side of the cover and the opposite side wall of the base so that, in the closed condition, the base and the cover are co-oriented and the connector lies across and within the passageway and, in the open condition, the cover is adjacent and co-oriented with the base, the cover being movable from the closed position to the open condition without reorientation into an upside down position relative to the base.

14. A receptacle as defined in claim 13 wherein the base, cover and connector are made of plastic.

* * * * *